United States Patent [19]

Clavenna et al.

[11] Patent Number: 5,348,717
[45] Date of Patent: Sep. 20, 1994

[54] SYNTHESIS GAS FROM PARTICULATE CATALYSTS, AND ADMIXTURES OF PARTICULATE CATALYSTS AND HEAT TRANSFER SOLIDS

[75] Inventors: LeRoy R. Clavenna; Stephen M. Davis; Geoffrey R. Say, all of Baton Rouge, La.; Rocco A. Fiato, Basking Ridge, N.J.

[73] Assignee: Exxon Research & Engineering Co., Florham Park, N.J.

[21] Appl. No.: 60,332

[22] Filed: May 11, 1993

[51] Int. Cl.$^5$ .......................... C01B 3/02; C01B 3/26; C01B 31/18
[52] U.S. Cl. .................. 423/418.2; 252/373; 423/648.1; 423/651; 423/652; 423/653; 423/654
[58] Field of Search ............... 423/415 A, 648.1, 651, 423/652, 653, 654, 418.2

[56] References Cited

U.S. PATENT DOCUMENTS

| | | | |
|---|---|---|---|
| 3,340,011 | 9/1967 | Hoekstra et al. | 423/651 |
| 4,711,872 | 12/1987 | Kato et al. | 502/328 |
| 4,788,174 | 11/1988 | Arai | 502/324 |
| 4,959,339 | 9/1990 | Arai | 502/302 |
| 4,977,128 | 12/1990 | Kato et al. | 502/328 |
| 4,988,661 | 1/1991 | Arai et al. | 502/327 |

*Primary Examiner*—Wayne Langel
*Attorney, Agent, or Firm*—Jay Simon

[57] ABSTRACT

A process utilizing a particulate catalyst, or particulate catalyst admixed with particulate heat transfer solids for conducting high temperature fluidized bed syn gas operations. Hydrogen and carbon monoxide are produced from a low molecular weight hydrocarbon by contact thereof, at high temperature in the presence of oxygen, or steam and oxygen, with a fluidized bed comprising said particulate solids. In one of its forms, barium hexaluminate is employed as a heat transfer solid, in concentrations ranging generally from about 10 wt. % to about 99.9 wt. %, in admixture with a particulate catalyst containing a metal, or metals, component catalytic for the production of hydrogen and carbon monoxide from low molecular weight hydrocarbons contacted with a fluidized bed of the catalyst at high temperature hydrothermal conditions. The catalyst, suitably one having a barium hexaluminate carrier component, is employed in concentration ranging generally from about 0.1 wt. % to about 90 wt. %. Such an admixture provides a particularly useful catalytic contact mass for conducting fluidized bed synthesis gas generation operations. This type of bed promotes continuous, highly efficient heat and mass transfer within the reacting gas phase. The presence of the catalyst having a barium hexaluminate carrier component, or barium hexaluminate heat transfer solid as a bed component maintains excellent bed fluidization characteristics, suppressing the normal tendency of the catalyst to sinter or agglomerate; tendencies which promote defluidization of the bed. Moreover, the heat transfer particles of the bed are highly attrition resistant, and are chemically compatible with the catalyst particles of the admixture.

12 Claims, No Drawings

SYNTHESIS GAS FROM PARTICULATE CATALYSTS, AND ADMIXTURES OF PARTICULATE CATALYSTS AND HEAT TRANSFER SOLIDS

1. Field of the Invention

This invention relates to a process for the production of hydrogen and carbon monoxide from hydrocarbons in high temperature reactions utilizing fluidized beds of synthesis gas generation catalysts, or admixtures of synthesis gas generation catalysts and heat transfer solids.

2. Background

Particulate refractory inorganic oxide solids, e.g. alumina, have been employed for many years as catalyst supports, or carriers, in natural or synthetic form. For example, synthesis gas, or syn gas (hydrogen and carbon monoxide) is produced from low molecular weight hydrocarbons, primarily methane, by contact with a bed of fluidized catalyst, e.g. nickel on an alumina support, in the presence of steam (steam reforming process), or oxygen (partial oxidation process), or both steam and oxygen, at high temperature. Suitably, particulate refractory inorganic oxide solids, notably alpha alumina solids, are admixed with the catalyst of the fluidized bed as heat transfer solids to control the temperature of reaction. Processes wherein low molecular weight hydrocarbons are converted to syn gas within the presence of both steam and oxygen offer particular advantages in that the syn gas can be better control led to provide hydrogen:carbon monoxide ratios particularly suitable for conducting Fischer-Tropsch reactions; i.e. about 2:1.

Fluidized bed processes offer particular advantages in that they provide superior heat, and mass transfer characteristics as contrasted with fixed bed processes. They permit substantially isothermal reactor conditions in conducting exothermic and endothermic reactions, provided that the fluidized characteristics of the bed can be maintained throughout the operation. To maintain the required fluidization characteristics, it is essential that the particulate bed solids have the capacity to resist melting and agglomeration at the high temperatures required for syn gas operations. Sintering and agglomeration of the solids reduce fluidization quality, produce large gas bubbles, and decrease mass transfer. Moreover, the particulate bed solids must mechanically withstand the stress and strain of process operations since the amount of mechanical fracturing and attrition of the particles that can be tolerated is severely limited. Process economics often militates against the use of devices which prevent the escape of any fines from the process, and generally, with the devices that are used, some fines are lost from the reactor.

In a fluidized bed operation a gas, or gases, must be injected upwardly into the bed at velocity sufficient to overcome the free fall velocities of the individual solid particles, expand the bed, and produce some bubble formation. Inevitably, as fluidization occurs, some of the solid particles are swept from the bed by the ascending gas, or gases. Whereas cyclone separators are widely used, and can be used to return major concentrations of the solid particles to the bed, no cyclone separator, or system of cyclone separators can be operated with one hundred percent efficiency; and, inevitably, a significant amount of the particulate solids may escape from the process. Where the particulate solids are toxic, however advantageous their use in the fluidized bed operation, the threat of escape of the solids to the environment makes it necessary to use special handling facilities to prevent the escape of the toxic solids.

Various inorganic metal oxides have been used as carriers, or supports, for catalytic metals in the production of catalysts; one of the most widely commercially used of which is alumina because of its good mechanical strength, heat resistance and chemical stability. Barium has also been disclosed in the literature as a carrier component, e.g. as exemplified by U.S. Pat. No. 4,988,661 which issued on Jan. 29, 1991 to Arai et al. This patent discloses a steam reforming catalyst, the carrier component of which consists essentially of aluminum oxide, $Al_2O_3$, and a metal oxide expressed as MeO comprising about 3-35 moles of metal oxide, MeO, to 100 moles of aluminum oxide, $Al_2O_3$, in the carrier, Me being at least one metal selected from the group consisting of calcium, strontium and barium. The supported catalytically active metals are at least one of nickel, cobalt or platinum group metals in concentration ranging from 3 to 50 parts by weight per 100 parts by weight of the carrier. In forming the carrier, aluminum oxide and/or aluminum hydroxide and an Me compound (wherein, e.g., Me is barium, and the compound is barium carbonate) in an $Al_2O_3$:MeO mole ratio of 100:(3-35) are mixed together, and calcined to form a mixture of complex oxides, or mixed oxides phases, including largely $MeO.6Al_2O_3$, e.g. $BaO.6Al_2O_3$, with other aluminates, e.g. $BaO.Al_2O_3$, many of which are water soluble or leachable. Albeit carriers constituted of mixtures of complex barium oxides may be useful as steam reforming catalysts in conventional fixed-bed reactors wherein the catalyst is physically constrained in the reaction zone, water soluble forms of barium are not useful in fluidized bed operations. This is because such forms of barium are toxic, and airborne particles of these materials would inevitably find their way into the environment.

3. Description Of The Invention

The present invention relates to a process for the production of hydrogen and carbon monoxide from a low molecular weight hydrocarbon by contact thereof, at high temperature in the presence of oxygen, or steam and oxygen, with a fluidized bed comprising (i) a catalyst comprised of a particulate barium hexaluminate ($BaO.6Al_2O_3$) solid composited with a metal, or metals, component catalytic for the production of hydrogen and carbon monoxide from low molecular weight hydrocarbons when contacted with a fluidized bed of the catalyst at high temperature, or (ii) a particulate barium hexaluminate ($BaO.6Al_2O_3$) heat transfer solid admixed with a particulate catalyst which can be the same or different from the catalyst (i), supra. The particulate catalyst characterized in (i) is comprised of barium hexaluminate composited with a metal, or metals, suitably nickel, platinum, ruthenium or the like, catalytic for the production of hydrogen and carbon monoxide from low molecular weight hydrocarbons contacted with a fluidized bed of the catalyst at high temperature hydrothermal conditions. The particulate barium hexaluminate heat transfer solid characterized in (ii) can be admixed with these, or other catalysts suitable for the production of hydrogen and carbon monoxide from low molecular weight hydrocarbons contacted with a fluidized bed of an admixture of the catalyst and heat transfer solids at high temperature hydrothermal conditions.

The particulate catalyst characterized in (i), and the barium hexaluminate heat transfer solids characterized in (ii), respectively, are of average particle diameter ranging from about 30 microns to about 150 microns, preferably from about 60 microns to about 90 microns in diameter. The barium component of the barium hexaluminate carrier portion of the catalyst, or barium component of the particulate barium hexaluminate heat transfer solid constituting a part of the bed, is essentially non-leachable with water and free of water leachable forms of barium. In its preferred form the carrier component or catalyst, and heat transfer component will contain a maximum of 100 milligrams of barium per liter of leachant, and more preferably a maximum of 50 milligrams of barium per liter of leachant when tested in accordance with the Environmental Protection Agency's: Test Methods For Evaluating Solid Waste, SW-846, with revisions given in the Federal Register Vol. 55, No. 126, dated Jun. 29, 1990, with Barium Method 7080, dated July 1982 in the Toxicity Characteristic Leaching Procedure, Method No. 1311 described in the Federal Register Vol. 55, No. 126, Appendix II. A 100 gram specimen of the carrier, catalyst, or heat transfer solid when tested in accordance with this procedure is leached with two liters of the leaching solution, which will provide a leachant which will preferably contain from 0 to 100 milligrams per liter of barium, and more preferably from 0 to 50 milligrams per liter of barium. This is equivalent to leaching from 0 to 0.2 wt. % barium, and preferably from 0 to 0.1 wt. % barium, from the specimen.

The particulate barium hexaluminate carrier component of the catalyst, or the particulate barium hexaluminate heat transfer solids are typically prepared by mixing aluminum oxide, or aluminum hydroxide, or both, and a barium compound, suitably barium carbonate, barium nitrate, barium acetate, barium nitrite, barium oxide or the like, in an $Al_2O_3$:BaO mole ratio of 100:(b 1-16), and then calcining the mixture at temperatures ranging from about 1200° C. to about 1700° C., and higher, preferably from about 1400° C. to about 1600° C., for a period sufficient to convert essentially the entire amount of the mixture to barium aluminate phases, and the barium aluminate phases that are formed to essentially barium hexaluminate. At these temperatures the barium aluminate phases that are produced are generally converted to essentially barium hexaluminate, an essentially non-leachable form of barium, in from about 0.5 to about 16 hours, and more often from about 1 hour to about 4 hours. The catalyst, where the barium hexaluminate is to be used to form a catalyst, is composited with a metal, or metals, catalytic for the conversion of low molecular weight hydrocarbons to hydrogen and carbon monoxide when contacted with a fluidized bed of the catalyst at high temperature hydrothermal conditions, e.g. nickel, platinum, ruthenium and the like. Or, the particulate barium hexaluminate can be admixed with this, or other catalysts similarly useful for syn gas production, e.g. a nickel-on-alumina catalyst, and employed to great advantage as a heat transfer solid. An admixture of from about 10 percent to about 99.9 percent, preferably from about 80 percent to about 99.5 percent, of said particulate barium hexaluminate solid, and from about 0.1 percent to about 90 percent, preferably from about 0.5 percent to about 20 percent, of the catalyst, based on the total weight of the admixture (dry basis), can be fluidized at temperatures ranging to about 1430° C., particularly at temperatures ranging between about 870° C. and 1090° C., and contacted with a low molecular weight hydrocarbon, e.g. $C_1$-$C_4$ alkanes, predominantly methane, in the presence of oxygen (air), or both steam and oxygen (air), to produce syn gas without significant sintering of the particulate barium hexaluminate heat transfer solids or catalyst components of the admixture. Likewise, there is no significant disintegration of either the heat transfer or catalyst components of the admixture to fines, or degradation of the particles of the admixture to produce agglomerates. The barium hexaluminate particles, in either its catalyst form or heat transfer solids form, are highly resistant to sintering, attrition and agglomeration per se, and in its heat transfer solids form, when admixed with a catalyst the support component of which is not barium hexaluminate, imparts high resistance to sintering and agglomeration of the catalyst, particularly at the severe high temperature hydrothermal conditions common to fluid bed syn gas operations.

In its most preferred form, the catalyst, or the catalyst component of the fluidized mixture, contains generally from about 1 percent to about 20 percent nickel, preferably from about 5 percent to about 10 percent nickel, composited with a barium hexaluminate support, or carrier, suitably by impregnation or coprecipitation methods. The mean average diameter of the catalyst particles ranges from about 30 microns to about 150 microns, preferably from about 60 microns to about 90 microns; particles of size distribution which can be per se readily fluidized, or fluidized along with the heat transfer solids particles, preferably barium hexaluminate solids particles, and contacted, with a light hydrocarbon feed, $C_1$-$C_4$ alkanes, predominantly methane and an oxygen-containing gas (air), or methane and both steam and oxygen, at elevated temperature sufficient to convert the hydrocarbon feed to syn gas without significant degradation of the particles of the bed to fines, and without sintering, or catalyst agglomeration.

This invention will be better understood via the following illustrative examples, which demonstrate specific and preferred embodiments.

EXAMPLES

A series of runs were made with a commercially obtained barium aluminate having a nominal stoichiometry $BaO.6Al_2O_3$, and mesh size ranging between about 45 microns and 106 microns. Specimens of the material were investigated after calcination at temperatures ranging from 1300° C. to 1600° C., as indicated in the first column of the Table. Each portion of the $BaO.6Al_2O_3$ tested was heated at the temperature given for a period of about 3 hours, and thereafter tested by leaching a 5 gram sample with distilled water in a Soxhlet extractor for 24 hours; the extracted liquid was acidified with HCl to a pH of about 0.3 and then analyzed on a direct coupled plasma (DCP) emission spectrometer to determine the weight percent of leachable barium. Reference is made to the second column of the Table. In addition, each of the heated specimens was tested to determine its agglomeration characteristics, and its ability to resist attrition as described in the third and fourth columns of the Table, respectively. Thus, in one series of tests specimens of the heated barium hexaluminate solids were subjected to agglomeration tests at 1650° C. Each of the specimens, weighing about 8 to 10 grams, was placed in a Coor's alumina boat, put into a high temperature Lindbergh furnace heated from room temperatures to 1650° C. over a period of about 5 hours, and then held at this temperature for three hours to induce thermal agglomeration. Each of the specimens was then cooled over a period of about 6 to 12 hours to about 100° C., removed from the furnace, and then transferred to a sonic sieve operated at constant power. Measurement by weighing the fractions collected on a 150 mesh size screen was then made to determine the conversion of the 45 to 106 micron particles to fused agglomerates greater than 106 microns in size. Specimens were subjected to treatment in a jet attritor to determine the Davison Attrition Index, D.I., of the particles; a measure of attrition resistance of a particle which has been found to correlate well with the attrition, and production of fines which occurs in a large fluidized bed syn gas generation pilot plant.

The Davison Index, D.I., is an attrition index method based on that developed by Davison Chemical Division of W. R. Grace & Company. The method uses a jet cup attrition technique that reports as the D.I. the wt % of <20 μm fines produced in a controlled attrition test. The D.I. test apparatus consists of two main vessels, the attrition vessel and the elutriation vessel. The attrition and elutriation vessels have diameters of 9 in. and 4.5 in., respectively. Each vessel is 24 in. high and has a cone shaped bottom that slopes about 15° from vertical. The jet cup attritor which holds the sample for attrition attaches to the bottom of the attrition vessel and is 1.03 in. I. D. by 2 in. deep. A 0. 0625 in. diameter hole forms the jet that enters the cup's wall horizontally and is tangent to the inside wall and bottom of the cup. A sample of 6±0.3 g is attrited for 20 minutes with $N_2$ (35% relative humidity) at a flow rate of about 21 Liters/minute, L/min (this flow rate is fine-tuned to give a D. I. of 27±2 for a standard CZB-1 Davison catalyst). Fines (wt 1) escaping the attrition vessel are collected in an extraction thimble. After the attrition the sample is transferred to the elutriation unit to separate the remainder of the <20 μm fines from the sample. The sample is placed in a cup with similar dimensions to the jet cup but with a sintered metal distributor at the bottom to uniformly fluidize the sample in the elutriator. This cup with the attrited sample is connected to the bottom of the elutriator, and the sample is elutriated for 20 min with $N_2$ (354 relative humidity) at 9 L/min. The elutriation removes the <20 μm fines from the sample to give a remaining coarse fraction (wt 3). The elutriated fines (wt 2) are collected in an extraction thimble connected to the exit of the elutriation vessel. In a separate measurement, the wt % of <20 μm fines (% Pre Att) is determined in a fresh sample. The D.I. which represents the wt % of <20 μm fines formed by the attrition is calculated given by the expression $$DI = \frac{\frac{[(wt\ 1) + (wt\ 2)]}{[(wt\ 1) + (wt\ 2) + (wt\ 3)]} \times 100 - (\%\ Pre\ Att)}{100 - (\%\ Pre\ Att)} \times 100.$$

TABLE

| Properties of Barium Aluminates | | | |
|---|---|---|---|
| Precalcination T (°C.) | Leachable Ba (Wt %) | Agglomeration (wt % + 106 um) | Attrition DI (Wt %) |
| 1300 | 2.5 | 0.1 | 6.9 |
| 1400 | 0.13 | 0.1 | 8.4 |
| 1550 | 0.031 | 0.1 | 4.9 |

TABLE-continued

| Properties of Barium Aluminates | | | |
|---|---|---|---|
| Precalcination T (°C.) | Leachable Ba (Wt %) | Agglomeration (wt % + 106 um) | Attrition DI (Wt %) |
| 1600 | 0.026 | 0.5 | 5.7 |

These data show that the amount of leachable barium of the commercially obtained barium hexaluminate specimen could be greatly reduced with increased calcination temperature to less than 0.1 wt. % per 100 grams of barium hexaluminate. The data show that the agglomeration resistance showed little dependence on calcination severity, and that the agglomeration resistance of the material is acceptable in all cases. The attrition resistance overall was improved, at least slightly, with high temperature calcination. Thus, in the production of syn gas in fluidized bed operations the strength of the particles are particularly important. Fines will be entrained, and removed from the bed regardless of the presence of cyclones used for fines recovery. This represents waste even where there is no toxicity problem, and leads to fouling of downstream equipment, e.g. heat exchangers. D.I. indexes greater than 15 are unacceptable, and preferably the D.I. index should be no greater than about 6. The barium solubility is thus lowered, by heating, to a value which renders a barium hexaluminate without significant water solubility; a form providing, by virtue of this and other of its characteristics, a material suitable as the carrier component of a catalyst, or heat transfer solid in syn gas fluidized bed operations.

It is apparent that various modifications and changes can be made without departing the spirit and scope of the invention.

Having described the invention, what is claimed is:

1. In a process for the production of hydrogen and carbon monoxide from a low molecular weight hydrocarbon by contact with a fluidized bed of catalyst at elevated temperature in the presence of oxygen, or both steam and oxygen, the improvement wherein the fluidized bed is comprised of
   an admixture of
       a particulate consisting essentially of non-leachable barium hexaluminate solids of fluidizable particle diameter in concentration ranging from about 10 percent to about 99.9 percent, based on the weight of the admixture, and
       a catalyst comprised of a carrier component composited with a metal, or metals, component catalytic for the production of hydrogen and carbon monoxide from low molecular weight hydrocarbons when contacted with a fluidized bed of the catalyst, in concentration ranging from about 0.1 percent to about 90 percent, based on the weight of the admixture.

2. The process of claim 1 wherein the average particle diameter of both the barium hexaluminate and catalyst particles of the admixture ranges from about 30 microns to about 150 microns.

3. The process of claim 2 wherein the average particle diameter of both the barium hexaluminate and catalyst particles of the admixture ranges from about 60 microns to about 90 microns.

4. The process of claim 1 wherein the concentration of the barium hexaluminate component of the admixture ranges from about 80 percent to about 99.5 percent, and the catalyst component ranges from about 0.5 percent to about 20 percent.

5. The process of claim 1 wherein the metal, or metals, component of the catalyst is comprised of nickel, platinum, or ruthenium.

6. The process of claim 5 wherein the metal component of the catalyst is nickel, and the nickel is composited with the carrier component in concentration ranging from about 1 percent to about 20 percent, based on the weight of the catalyst.

7. The process of claim 6 wherein the nickel component is composited with the carrier in concentration ranging from about 5 percent to about 10 percent.

8. The process of claim 1 wherein the catalyst component of the admixture is barium hexaluminate composited with nickel, and the barium hexaluminate is one having an $Al_2O_3$:BaO mole ratio of 100:(1-16).

9. The process of claim 8 wherein the nickel-on-barium hexaluminate catalyst contains from about 1 percent to about 20 percent nickel, based on the weight of the catalyst.

10. The process of claim 9 wherein the catalyst contains from about 5 percent to about 10 percent nickel.

11. The process of claim 1 wherein the average particle diameter of the barium hexaluminate component of the admixture ranges from about 60 microns to about 90 microns, and the barium hexaluminate component ranges in concentration from about 80 percent to about 99.5 percent within the admixture; and the catalyst component of the admixture is nickel-on-barium hexaluminate containing from about 5 percent to about 10 percent nickel, and the catalyst is present within the admixture in concentration ranging from about 0.5 percent to about 20 percent.

12. The process of claim 1 wherein the barium hexaluminate solids of the admixture are precalcined at temperatures ranging from about 1200° C. to about 1700° C.

* * * * *